(12) United States Patent
Chen (10) Patent No.: US 11,933,719 B2
(45) Date of Patent: Mar. 19, 2024

(54) POSTURE ADJUSTMENT DEVICE AND METHOD FOR OPTICAL SENSOR, AND AUTOMATIC MATERIAL TRANSPORT SYSTEM

(71) Applicant: CHANGXIN MEMORY TECHNOLOGIES, INC., Anhui (CN)

(72) Inventor: Tianzhu Chen, Hefei (CN)

(73) Assignee: CHANGXIN MEMORY TECHNOLOGIES, INC., Anhui (CN)

( * ) Notice: Subject to any disclaimer, the term of this patent is extended or adjusted under 35 U.S.C. 154(b) by 457 days.

(21) Appl. No.: 17/443,731

(22) Filed: Jul. 27, 2021

(65) Prior Publication Data
US 2021/0396656 A1    Dec. 23, 2021

Related U.S. Application Data

(63) Continuation of application No. PCT/CN2021/094220, filed on May 17, 2021.

(30) Foreign Application Priority Data

Jun. 19, 2020 (CN) .......................... 202010568575.9

(51) Int. Cl.
*G01N 21/27* (2006.01)
*H02N 2/12* (2006.01)
*H02N 2/14* (2006.01)
*B60K 35/00* (2006.01)

(52) U.S. Cl.
CPC ............. *G01N 21/278* (2013.01); *H02N 2/12* (2013.01); *H02N 2/142* (2013.01); *B60K 35/00* (2013.01)

(58) Field of Classification Search
CPC ........ G01N 21/278; H02N 2/12; H02N 2/142; H02N 2/023; H02N 2/0095; B60K 35/00; G01C 15/00; G01C 21/00; G01C 15/002; G01S 17/931; B25J 9/16
See application file for complete search history.

(56) References Cited

U.S. PATENT DOCUMENTS

| 4,694,527 A * | 9/1987 | Yoshizawa | ............... B08B 11/00 |
| | | | 15/302 |
| 5,894,122 A * | 4/1999 | Tomita | ................... B82Y 20/00 |
| | | | 250/234 |
| 6,746,543 B2 * | 6/2004 | Kamikawa | ........ H01L 21/67051 |
| | | | 134/28 |

(Continued)

FOREIGN PATENT DOCUMENTS

| CN | 101596522 B | 10/2011 |
| CN | 107941238 A | 4/2018 |

(Continued)

*Primary Examiner* — Mussa A Shaawat
(74) *Attorney, Agent, or Firm* — Syncoda LLC; Feng Ma (57) ABSTRACT

A posture adjustment device for an optical sensor includes: a controller, a posture detector, and a posture adjustment structure. An optical sensor to be detected is fixed on the posture adjustment structure. The posture detector receives an emitted beam of the optical sensor to be detected, detects a posture of the optical sensor to be detected according to the emitted beam, and sends posture information to the controller. The controller controls, according to the posture information, the posture adjustment structure to adjust the posture of the optical sensor to be detected.

17 Claims, 7 Drawing Sheets

(56) References Cited

U.S. PATENT DOCUMENTS

| | | | | |
|---|---|---|---|---|
| 7,809,160 B2* | 10/2010 | Vertegaal | ............... | G06F 3/013 |
| | | | | 345/157 |
| 9,075,563 B2* | 7/2015 | Kim | ..................... | G01C 21/365 |
| 10,996,481 B1* | 5/2021 | Wells | ..................... | B60K 35/00 |
| 2006/0267622 A1* | 11/2006 | Lagowski | ............ | G01R 31/312 |
| | | | | 324/754.21 |
| 2007/0019297 A1* | 1/2007 | Stewart | ............. | G02B 27/0149 |
| | | | | 359/630 |
| 2008/0158096 A1* | 7/2008 | Breed | .................. | B60R 25/257 |
| | | | | 340/436 |
| 2010/0198506 A1* | 8/2010 | Neilhouse | ........... | G01C 21/365 |
| | | | | 701/532 |
| 2010/0253542 A1* | 10/2010 | Seder | .................... | G01S 13/931 |
| | | | | 340/425.5 |
| 2011/0260965 A1* | 10/2011 | Kim | ....................... | G06F 3/017 |
| | | | | 345/156 |
| 2017/0017168 A1* | 1/2017 | Liao | .................... | G03F 7/70725 |
| 2019/0011983 A1* | 1/2019 | Yasuda | ............... | G06F 3/04842 |
| 2019/0302806 A1 | 10/2019 | Iwakura et al. | | |
| 2020/0103649 A1* | 4/2020 | Higashiyama | ..... | G03B 21/2066 |
| 2020/0105231 A1* | 4/2020 | Higashiyama | ......... | B60K 37/02 |
| 2020/0174100 A1* | 6/2020 | Hori | ..................... | B60Q 1/0023 |
| 2021/0157135 A1* | 5/2021 | Wells | ..................... | G06T 7/0002 |
| 2022/0102177 A1* | 3/2022 | Chiu | .................... | H05K 5/0208 |

FOREIGN PATENT DOCUMENTS

| | | |
|---|---|---|
| CN | 108908337 A | 11/2018 |
| CN | 109760064 A | 5/2019 |
| CN | 109946703 A | 6/2019 |
| CN | 209167900 U | 7/2019 |
| CN | 108512457 B | 10/2019 |

* cited by examiner

POSTURE ADJUSTMENT DEVICE AND METHOD FOR OPTICAL SENSOR, AND AUTOMATIC MATERIAL TRANSPORT SYSTEM

CROSS-REFERENCE TO RELATED APPLICATIONS

This application is a continuation of International Patent Application No. PCT/CN2021/094220 filed on May 17, 2021, which claims priority to Chinese Patent Application No. 202010568575.9 filed on Jun. 19, 2020. The disclosures of these applications are hereby incorporated by reference in their entirety.

BACKGROUND

With the development of science and technology, the automation technology is gradually used in all walks of life, and is widely used especially in manufacturing industry. For example, an automatic material transport system can transport materials from a loading inlet to a discharging outlet to save the cost of manpower transport.

SUMMARY

The present disclosure relates to the technical field of optical detection, and more specifically to a posture adjustment device and method for an optical sensor, and an automatic material transport system.

Various embodiments of the present disclosure provide a posture adjustment device and method for an optical sensor, and an automatic material transport system, to automatically adjust a posture of the optical sensor, reduce the manpower cost and improve the posture adjustment efficiency of the optical sensor.

In a first aspect of embodiments of the present disclosure, there is provided a posture adjustment device for an optical sensor, which may include: a controller, a posture detector, and a posture adjustment structure. An optical sensor to be detected is fixed on the posture adjustment structure. The posture detector is configured to receive an emitted beam of the optical sensor to be detected, detect a posture of the optical sensor to be detected according to the emitted beam, and send posture information to the controller. The controller is configured to control, according to the posture information, the posture adjustment structure to adjust the posture of the optical sensor to be detected.

In a second aspect of embodiments of the present disclosure, there is provided a posture adjustment method for an optical sensor, which is applied to the above posture adjustment device for an optical sensor, and may include that following operations. The posture detector receives an emitted beam of the optical sensor to be detected, detects a posture of the optical sensor to be detected according to the emitted beam, and sends posture information; and the controller controls, according to the posture information, the posture adjustment structure to adjust the posture of the optical sensor to be detected.

In a third aspect of embodiments of the present disclosure, there is also provided an automatic material transport system, which may include: multiple material transport vehicles and the above posture adjustment device for an optical sensor. Each material transport vehicle includes a vehicle body and an optical sensor fixed on the vehicle body through the posture adjustment device.

DETAILED DESCRIPTION

The present disclosure is further explained in detail below in combination with the accompanying drawings and embodiments. It is understandable that the specific embodiments described here are used only to explain the present disclosure and not to limit it. It is to be noted that for ease of description, only part but not all of the structure relevant to the present disclosure is shown in the accompanying drawings.

An automatic material transport system usually includes multiple material transport vehicles, and the material transport vehicles can run on corresponding tracks, so that the material transport vehicles can transport the corresponding materials to the destination of the materials. An obstacle detection optical sensor is usually set on the material transport vehicle, so that the material transport vehicle can detect obstacles and other material transport vehicles in front of it during running on the track, to avoid collision. In order to ensure that the obstacle detection optical sensor set on the material transport vehicle can accurately detect the obstacles and/or the other material transport vehicles, it is necessary to adjust the posture of the obstacle detection optical sensor on the material transport vehicle before the material transport vehicle is put into use. In a case where the posture of the obstacle detection optical sensor on the material transport vehicle is adjusted by manually adding a shim after a corresponding detecting device is used for detection, a comparatively high manpower cost and low adjustment efficiency can be problematic.

Figure 1:
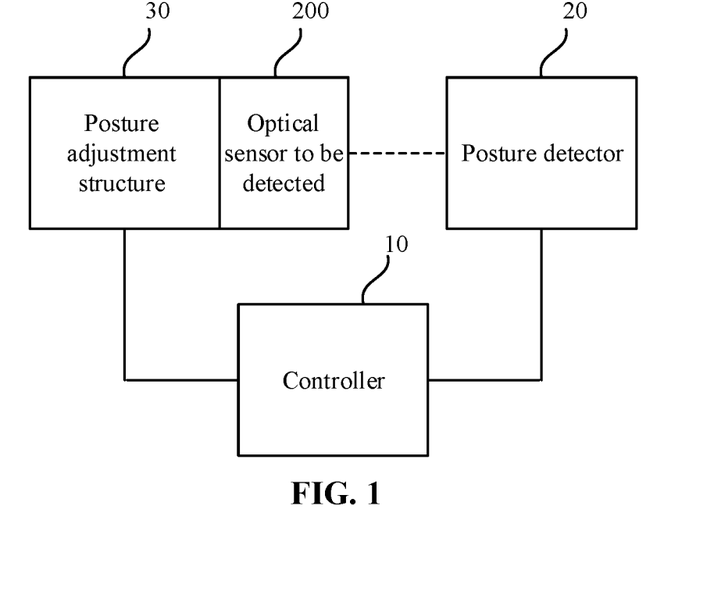
FIG. 1 is a schematic structure view of a posture adjustment device for an optical sensor provided by an embodiment of the present disclosure.

Various embodiments of the present disclosure provide a posture adjustment device for an optical sensor, which can automatically adjust a posture of an optical sensor, so that the optical sensor can have a reliable detection range. FIG. 1 is a schematic structure view of a posture adjustment device for an optical sensor provided by an embodiment of the present disclosure. As illustrated in FIG. 1, the posture adjustment device for the optical sensor includes: a controller 10, a posture detector 20, and a posture adjustment structure 30. An optical sensor to be detected 200 is fixed on the posture adjustment structure 30. The posture detector 20 can receive an emitted beam emitted by the optical sensor to be detected 200, detect a posture of the optical sensor to be detected 200 according to the emitted beam, and send posture information to the controller 10. The controller 10 can control, according to the corresponding posture information, the posture adjustment structure 30 to adjust the posture of the optical sensor to be detected 200.

Specifically, the optical sensor can measure a distance based on the principles of optics, so as to achieve a non-contact and non-destructive measurement. That is, the optical sensor sends out a corresponding emitted beam, and the emitted beam will return to the optical sensor when it encounters an obstacle, so that the optical sensor can determine a distance between its position and the obstacle, according to an interval time between the emitted beam and the received beam and a propagation speed of light in a medium. In addition, when the posture of the optical sensor changes, a propagation direction of the emitted light sent out by the optical sensor changes accordingly, thereby affecting a detection range of the optical sensor and affecting the detection accuracy of the optical sensor for the obstacle in a specific direction. Therefore, when an optical sensor is used for detecting the obstacle in a specific direction, it is necessary to detect and adjust the posture of the optical sensor.

In an embodiment of the present disclosure, the posture detector 20 receives the emitted beam from the optical sensor to be detected 200 to detect the posture of the optical sensor 200 to be detected. The posture may be, for example, a current position of the optical sensor to be detected 200 and a propagation direction of the emitted beam emitted from the optical sensor to be detected 200. A corresponding reflector may be arranged in the posture detector 20. When the emitted beam from the optical sensor to be detected 200 hits on the reflector of the posture detector 20, there will be a corresponding reflected light returning to the optical sensor to be detected 200, and then it can be known that the posture of the optical sensor to be detected 200 is in a preset posture range at present. Further, when the emitted beam from the optical sensor to be detected 200 does not hit on the reflector of the posture detector 20, it can be known that the posture of the optical sensor to be detected 200 is not in a preset posture range at present. In this case, the state of whether the emitted beam from the optical sensor to be detected 200 hits on the reflector of the posture detector 20 may be taken as the posture information and the posture information can be fed back to the controller 10. The controller 10 can control, according to the posture information, the posture adjustment structure 30 to adjust the posture of the optical sensor to be detected 200. Herein, the posture adjustment structure 30 can drive, under the control of the controller 10, the optical sensor to be detected 200 to move in a certain direction, or drive the optical sensor to be detected 200 to rotate around a certain rotation axis, to change the posture of the optical sensor to be detected 200, so that the emitted light emitted by the optical sensor to be detected 200 can propagate along a specific direction. Correspondingly, when the controller 10 controls the posture adjustment structure 30 to adjust the posture of the optical sensor to be detected 200, the posture detector 20 will receive the emitted beam from the optical sensor to be detected 200 in real time and send the posture information to the controller 10 in real time, until when the controller 10 learns, according to the posture information sent by the posture detector 20, that the current posture of the optical sensor to be detected 200 is a preset posture, the controller 10 will control the posture adjustment structure 30 to stop adjusting the posture of the optical sensor to be detected 200.

Figure 2:
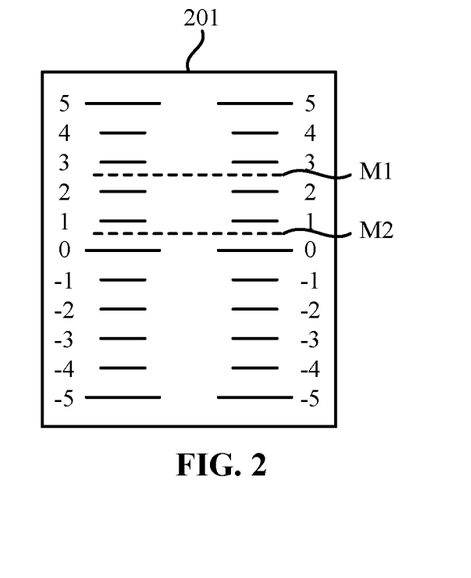
FIG. 2 is a schematic structure view of a beam receiving area of a posture detector provided by an embodiment of the present disclosure.

In an example, FIG. 2 is a schematic structure view of a beam receiving area of a posture detector provided by an embodiment of the present disclosure. As illustrated in FIG. 1 and FIG. 2, the posture detector 20 may include a beam receiving area 201 which is provided with a posture detection scale, and a detection range of the posture detection scale may be, for example, [+5, −5]. In this case, the emitted beam of the optical sensor to be detected 200 can be propagated to the beam receiving area 201 of the posture detector 20, and when the optical sensor to be detected 200 has different postures, the emitted beam of the optical sensor to be detected 200 has different positions in the beam receiving area 201 of the posture detector 20, so that the posture detector 20 can determine, according to the position of the emitted beam of the optical sensor to be detected 200 in the beam receiving area 201, a posture detection scale value of the emitted beam of the optical sensor to be detected 200 in the beam receiving area 201 and generate a corresponding posture information. That is, the posture detector 20 can generate the posture information according to the position of the emitted beam sent by the optical sensor to be detected 200 in the beam receiving area 201. When obtaining the posture information of the posture detector 20, the controller 10 can determine, according to the posture information, the posture detection scale value of the emitted beam of the optical sensor to be detected 200 in the beam receiving area 201. When the posture detection scale value is not in a preset posture detection scale range, the controller can control, according to the posture detection scale value, the posture adjustment structure 30 to adjust the posture of the optical sensor to be detected 200. Or, when the determined posture detection scale value is in the preset posture detection scale range, the controller 10 will control the posture adjustment structure 30 to stop adjusting the posture of the optical sensor to be detected 200.

For example, the preset posture detection scale range of [−1, 1] is taken as an example. As illustrated in FIG. 2, when the emitted beam M1 of the optical sensor to be detected 200 hits on a position between the posture detection scale values 2 and 3 of the beam receiving area 201, the controller 10 when receiving the posture information will control the posture adjustment structure 30 to drive the optical sensor to be detected 200 to move along a certain direction; until when the emitted beam M2 of the optical sensor to be detected 200 hits on a position between the posture detection scale values 0 and 1 of the beam receiving area 201, the controller 10 can learn according to the posture information that the posture detection scale value of the optical sensor to be detected 200 in the beam receiving area 201 is in the preset posture detection scale range; at this moment, the controller 10 will control the posture adjustment structure 30 to stop adjusting the posture of the optical sensor to be detected 200.

In this way, the embodiment of the present disclosure obtains the emitted beam of the optical sensor to be detected in real time through a posture detection device, and sends the posture information to the controller according to the emitted beam, so that the controller can control, according to the posture information, the posture adjustment structure to adjust the posture of the optical sensor to be detected to the preset posture, the posture of the optical sensor to be detected thus can be adjusted automatically, which saves manpower and improves the adjustment efficiency. Moreover, after the optical sensor to be detected is adjusted to the preset posture, the detection accuracy of the optical sensor to be detected can be improved.

Figure 3:
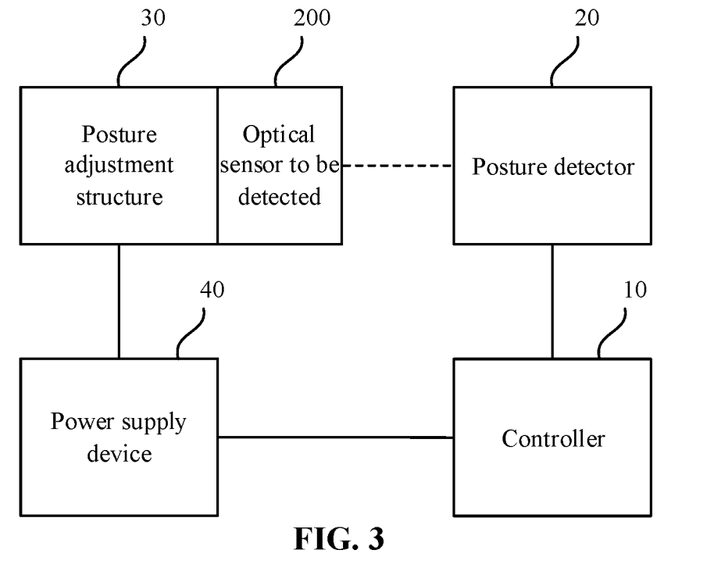
FIG. 3 is a schematic structure view of another posture adjustment device for an optical sensor provided by an embodiment of the present disclosure.

Optionally, FIG. 3 is a schematic structure view of another posture adjustment device for an optical sensor provided by an embodiment of the present disclosure. As illustrated in FIG. 3, based on the above embodiment, the posture adjustment device of the optical sensor to be detected further includes a power supply device 40, which may be electrically connected between the controller 10 and the posture adjustment structure 30. The power supply device 40 can provide a power supply for the posture adjustment structure 30 under the control of the controller 10.

In an example, a power source and a switch unit may be arranged in the power supply device 40, and the controller 10 can control the switch unit to turn on and turn off. That is, when the controller 10 controls the switch unit to turn on, the power source connects with the posture adjustment structure 30 through the turned-on switch unit, so that the power source can provide a power supply for the posture adjustment structure 30, and the posture adjustment structure 30 can drive the optical sensor to be detected 200 to move to adjust the posture of the optical sensor to be detected 200. When the controller 10 controls the switch unit to turn off, the power source cannot connect with the posture adjustment structure 30, and thus the power source cannot provide a power supply for the posture adjustment structure 30, which makes the posture adjustment structure 30 unable to work. In this case, the posture adjustment structure 30 cannot drive the optical sensor to be detected 200 to move, that is, the posture adjustment structure 30 stops adjusting the posture of the optical sensor to be detected 200. Thus, the power supply device 40 is electrically connected between the controller 10 and the posture adjustment structure 30, and the power supply device 40 is controlled by the controller 10 to provide a power supply for the posture adjustment structure 30 or stop providing a power supply for the posture adjustment structure 30, so as to achieve the purpose of controlling the posture adjustment structure 30.

Optionally, with continued reference to FIG. 3, the posture adjustment structure 30 may include a movable bracket, a fixed bracket and multiple piezoelectric adjusting bolts. The optical sensor to be detected 200 may be fixed on the fixed bracket of the posture adjustment structure 30, and the movable bracket is connected with the fixed bracket through the piezoelectric adjusting bolt. The controller 10 can control, according to the posture information sent by the posture detector 20, the power supply device 40 to provide a power supply for each piezoelectric adjusting bolt, and adjust the length of the piezoelectric adjusting bolt to adjust the posture of the optical sensor to be detected 200.

Specifically, the piezoelectric adjusting bolt may be a bolt provided with a piezoelectric adjusting structure, the piezoelectric adjusting structure may be such as a piezoelectric stack, in which piezoelectric ceramic plates may be stacked. By applying the power supply to the piezoelectric stack, the piezoelectric ceramic plates in the piezoelectric stack deform, and when providing the power supply to the piezoelectric stack is stopped, the piezoelectric ceramic plates in the piezoelectric stack will return to their original state, so as to achieve the purpose of adjusting the length of the piezoelectric adjusting bolt.

Figure 4:
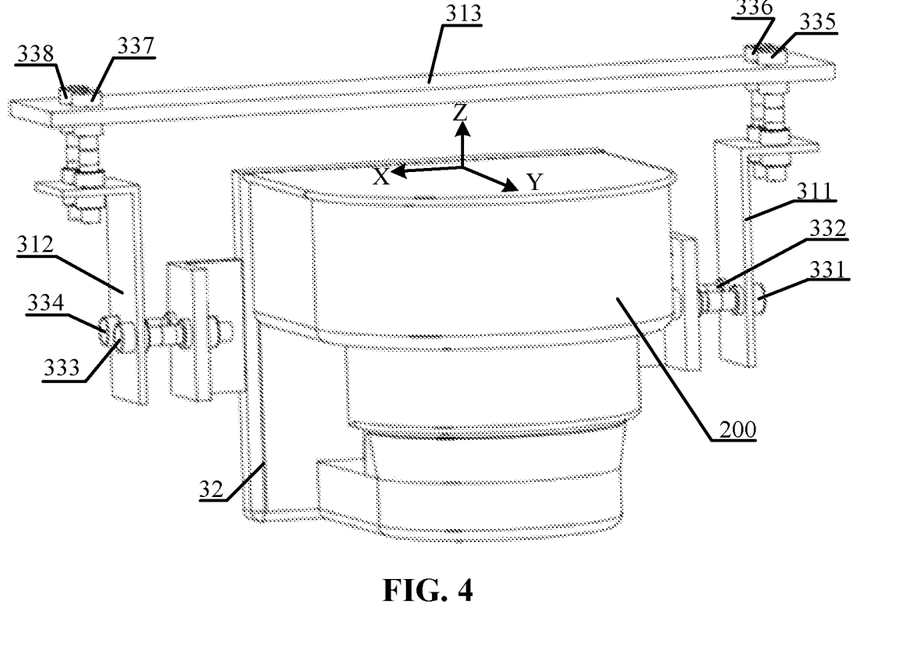
FIG. 4 is a three-dimensional schematic structure view of a posture adjustment structure provided by an embodiment of the present disclosure.
Figure 5:
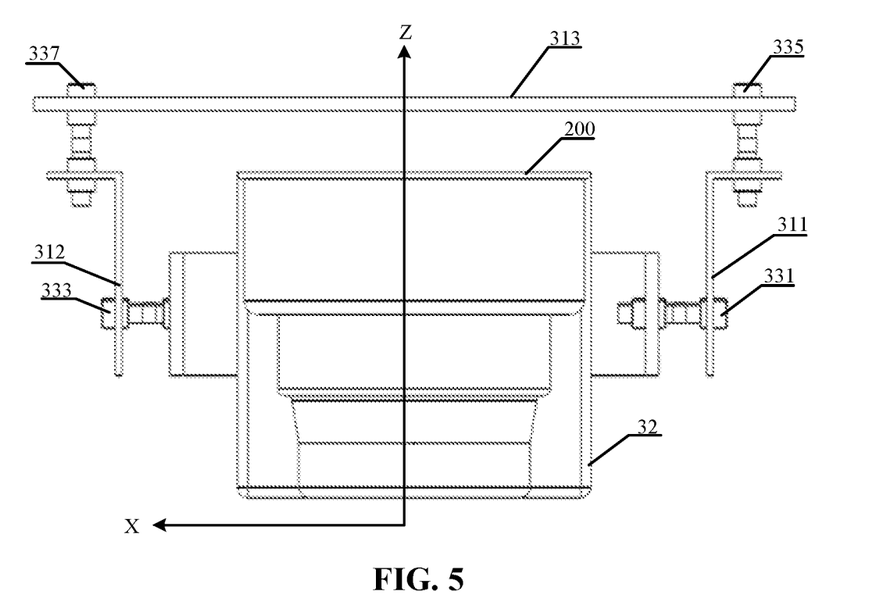
FIG. 5 is a front schematic structure view of the posture adjustment structure in FIG. 4.
Figure 6:
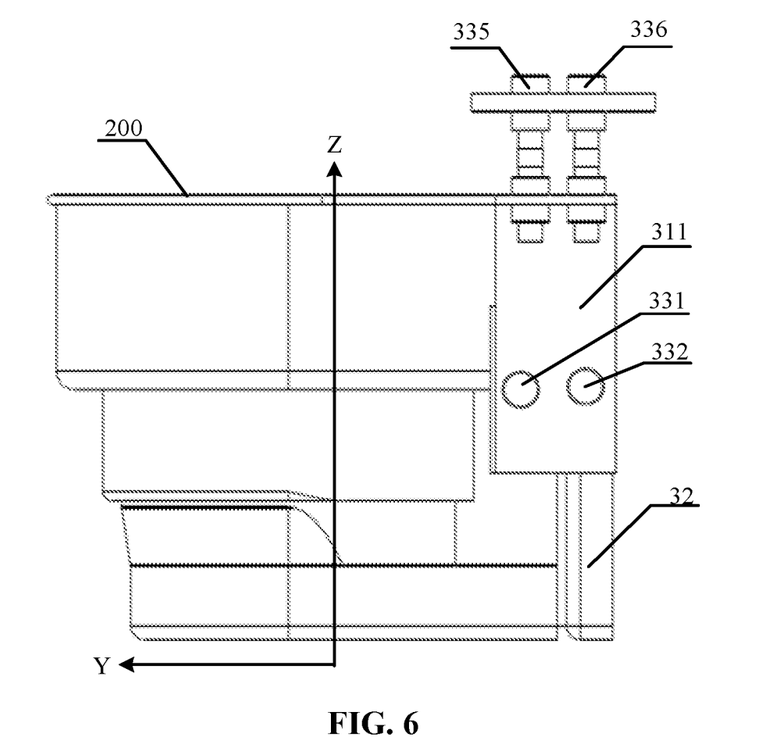
FIG. 6 is a side schematic structure view of the posture adjustment structure in FIG. 4.

In an example, FIG. 4 is a three-dimensional schematic structure view of a posture adjustment structure provided by an embodiment of the present disclosure, FIG. 5 is a front schematic structure view of a posture adjustment structure in FIG. 4, and FIG. 6 is a top schematic structure view of a posture adjustment structure in FIG. 4. As illustrated in FIG. 3, FIG. 4, FIG. 5 and FIG. 6, the movable bracket of the posture adjustment structure 30 may include a first movable plate 311, a second movable plate 312 and a third movable plate 313; the multiple piezoelectric adjusting bolts may include a first piezoelectric adjusting bolt 331, a second piezoelectric adjusting bolt 332, a third piezoelectric adjusting bolt 333, a fourth piezoelectric adjusting bolt 334, a fifth piezoelectric adjusting bolt 335, a sixth piezoelectric adjusting bolt 336, a seventh piezoelectric adjusting bolt 337 and an eighth piezoelectric adjusting bolt 338. The first movable plate 311 and the second movable plate 312 are located on opposite sides of the optical sensor to be detected 200. The first movable plate 311 is connected with the fixed bracket 32 through the first piezoelectric adjusting bolt 331 and the second piezoelectric adjusting bolt 332. The second movable plate 312 is connected with the fixed bracket 32 through the third piezoelectric adjusting bolt 333 and the fourth piezoelectric adjusting bolt 334. The third movable plate 313 is connected with the first movable plate 311 through the fifth piezoelectric adjusting bolt 335 and the sixth piezoelectric adjusting bolt 336. The third movable plate 313 is further connected with the second movable plate 312 through the seventh piezoelectric adjusting bolt 337 and the eighth piezoelectric adjusting bolt 338.

When lengths of the fifth piezoelectric adjusting bolt 335, the sixth piezoelectric adjusting bolt 336, the seventh piezoelectric adjusting bolt 337 and the eighth piezoelectric adjusting bolt 338 are increased simultaneously, the fixed bracket 32 can drive the optical sensor to be detected 200 to move in a negative direction of a first straight line direction Z. When the lengths of the fifth piezoelectric adjusting bolt 335, the sixth piezoelectric adjusting bolt 336, the seventh piezoelectric adjusting bolt 337 and the eighth piezoelectric adjusting bolt 338 are reduced simultaneously, the fixed bracket 32 can drive the optical sensor to be detected 200 to move in a positive direction of the first straight line direction Z. When lengths of the first piezoelectric adjusting bolt 331 and the second piezoelectric adjusting bolt 332 are increased, and simultaneously lengths of the third piezoelectric adjusting bolt 333 and the fourth piezoelectric adjusting bolt 334 are reduced, the fixed bracket 32 can drive the optical sensor to be detected 200 to move in a positive direction of a second straight line direction X. When the lengths of the first piezoelectric adjusting bolt 331 and the second piezoelectric adjusting bolt 332 are reduced, and simultaneously the lengths of the third piezoelectric adjusting bolt 333 and the fourth piezoelectric adjusting bolt 334 are increased, the fixed bracket 32 can drive the optical sensor to be detected 200 to move in a negative direction of the second straight line direction X. When the lengths of the third piezoelectric adjusting bolt 333 and the second piezoelectric adjusting bolt 332 are increased, and simultaneously the lengths of the fourth piezoelectric adjusting bolt 334 and the first piezoelectric adjusting bolt 331 are reduced, the fixed bracket 32 can drive the optical sensor to be detected 200 to rotate counterclockwise around the first straight line direction Z as an axis. When the lengths of the third piezoelectric adjusting bolt 333 and the second piezoelectric adjusting bolt 332 are reduced, and simultaneously the lengths of the fourth piezoelectric adjusting bolt 334 and the first piezoelectric adjusting bolt 331 are increased, the fixed bracket 32 can drive the optical sensor to be detected 200 to rotate clockwise around the first straight line direction Z as an axis. When the lengths of the eighth piezoelectric adjusting bolt 338 and the sixth piezoelectric adjusting bolt 336 are increased, and simultaneously the lengths of the seventh piezoelectric adjusting bolt 337 and the fifth piezoelectric adjusting bolt 335 are reduced, the fixed bracket 32 can drive the optical sensor to be detected 200 to rotate counterclockwise around the second straight line direction X as an axis. When the lengths of the eighth piezoelectric adjusting bolt 338 and the sixth piezoelectric adjusting bolt 336 are reduced, and simultaneously the lengths of the seventh piezoelectric adjusting bolt 337 and the fifth piezoelectric adjusting bolt 335 are increased, the fixed bracket 32 can drive the optical sensor to be detected 200 to rotate clockwise around the second straight line direction X as an axis. When the lengths of the fifth piezoelectric adjusting bolt 335 and the sixth piezoelectric adjusting bolt 336 are reduced, and simultaneously the lengths of the seventh piezoelectric adjusting bolt 337 and the eighth piezoelectric adjusting bolt 338 are increased, the fixed bracket 32 can drive the optical sensor to be detected 200 to rotate counterclockwise around a third straight line direction Y as an axis. When the lengths of the fifth piezoelectric adjusting bolt 335 and the sixth piezoelectric adjusting bolt 336 are increased, and simultaneously the lengths of the seventh piezoelectric adjusting bolt 337 and the eighth piezoelectric adjusting bolt 338 are reduced, the fixed bracket 32 can drive the optical sensor to be detected 200 to rotate clockwise around the third straight line direction Y as an axis.

Thus, by adjusting the lengths of the first piezoelectric adjusting bolt 331, the second piezoelectric adjusting bolt 332, the third piezoelectric adjusting bolt 333, the fourth piezoelectric adjusting bolt 334, the fifth piezoelectric adjusting bolt 335, the sixth piezoelectric adjusting bolt 336, the seventh piezoelectric adjusting bolt 337 and the eighth piezoelectric adjusting bolt 338, the fixed bracket 32 can drive the optical sensor to be detected 200 to move linearly or to rotate in all directions, so as to achieve the purpose of adjusting the posture of the optical sensor to be detected 200.

Figure 7:
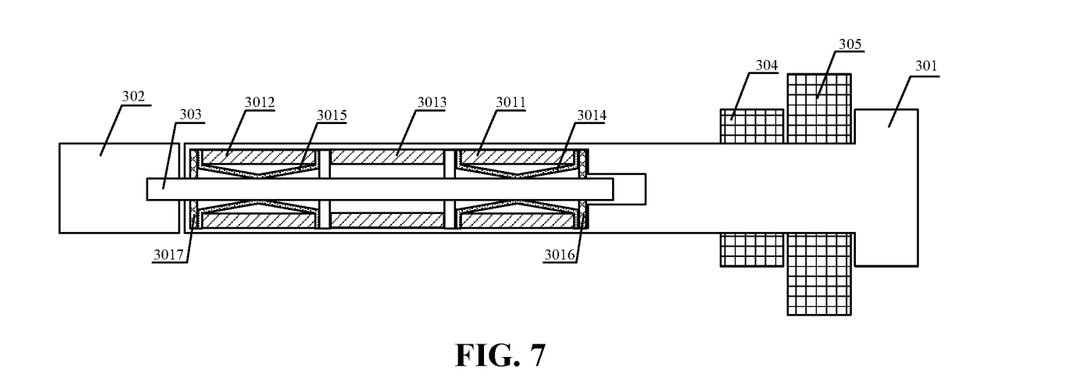
FIG. 7 is a schematic structure view of a piezoelectric adjusting bolt provided by an embodiment of the present disclosure.

Optionally, FIG. 7 is a schematic structure view of a piezoelectric adjusting bolt provided by an embodiment of the present disclosure. As illustrated in FIG. 7, the piezoelectric adjusting bolt may include a fixed screw rod 301, a movable screw rod 302 and a driving rod 303. One end of the driving rod 303 is connected with the movable screw rod 302, and another end of the driving rod 303 is movably arranged in the fixed screw rod 301. In the fixed screw rod 301, a first clamping arm 3014, a second clamping arm 3015, a first piezoelectric stack 3011, a second piezoelectric stack 3012 and a third piezoelectric stack 3013 are further provided. The first piezoelectric stack 3011, the third piezoelectric stack 3013 and the second piezoelectric stack 3012 are arranged in sequence, and the second piezoelectric stack 3012 is located at a side, close to the movable screw rod 302, of the third piezoelectric stack 3013. The first piezoelectric stack 3011 controls the first clamping arm 3014 to clamp the driving rod 303 when not receiving the power supply, and controls the first clamping arm 3014 to release the driving rod 303 when receiving the power supply, so that the driving rod 303 drives the movable screw rod 302 to shift or remains static. The second piezoelectric stack 3012 controls the second clamping arm 3015 to clamp the driving rod 303 when not receiving the power supply, and controls the second clamping arm 3015 to release the driving rod 303 when receiving the power supply, so that the driving rod 303 drives the movable screw rod 302 to shift or remains static. The third piezoelectric stack 3013 controls the first piezoelectric stack 3011 and/or the second piezoelectric stack 3012 to shift when receiving the power supply, so that the driving rod 303 drives the movable screw rod 302 to shift or remains static. Each piezoelectric stack may include multiple stacked piezoelectric ceramic plates. In addition, the piezoelectric adjusting bolt may also include a fixed plate 305 and a nut 304, so that the piezoelectric adjusting bolt is fixedly connected with the movable plate of the movable bracket. There are also spring washers 3016 and 3017 arranged in the fixed screw rod 301 of the piezoelectric adjusting bolt to provide deformation allowance for the piezoelectric stack.

Figure 8:
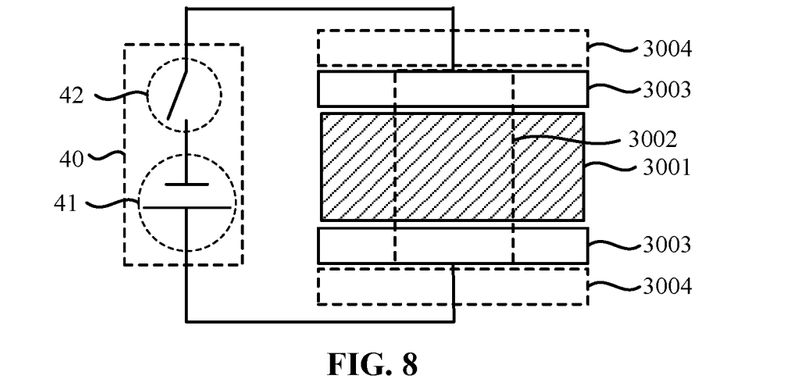
FIG. 8 is a structure diagram of an equivalent circuit of a piezoelectric stack provided by an embodiment of the present disclosure.

In an example, FIG. 8 is a structure diagram of an equivalent circuit of a piezoelectric stack provided by an embodiment of the present disclosure. As illustrated in FIG. 7 and FIG. 8, the first piezoelectric stack 3011, the second piezoelectric stack 3012 and the third piezoelectric stack 3013 which are arranged in the fixed screw rod 301 of the piezoelectric adjusting bolt each may include multiple piezoelectric ceramic plates 3001 and electrodes 3003 arranged on both ends of the piezoelectric ceramic plate, that is, may include n (n≥1 and n is an integer) piezoelectric ceramic plates. The power supply device 40 may include a power source 41 and a switch 42. When the switch 42 is turned off, the circuit composed of the power source 41 and the piezoelectric stack is in an open state, and the piezoelectric ceramic plate(s) 3001 in the piezoelectric stack may maintain the original state. When the switch 42 is turned on, the power source 41 and the piezoelectric stack form a loop, the piezoelectric ceramic plate(s) 3001 in the piezoelectric stack may be deformed (the state after deformation may be, for example, the reference sign 3002), and the corresponding electrodes 3003 on both ends of the piezoelectric ceramic plate also shift accordingly (the electrode 3003 is moved to 3004 after shifting), which can make the piezoelectric stack longer. When the switch 42 is turned off again, the piezoelectric ceramic plate will return to its original state.

Figure 9:
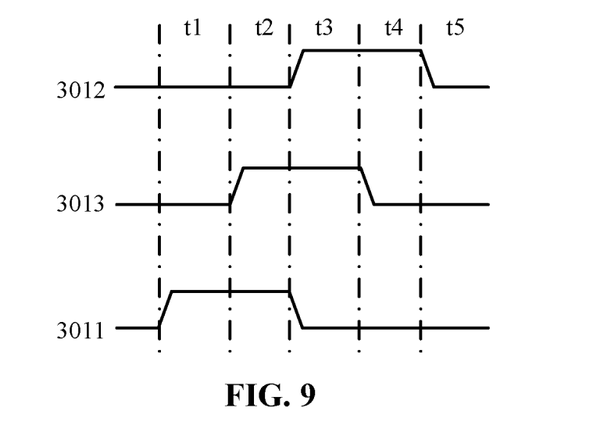
FIG. 9 is a sequence diagram representing that a piezoelectric adjusting bolt provided by an embodiment of the present disclosure is elongated.
Figure 10:
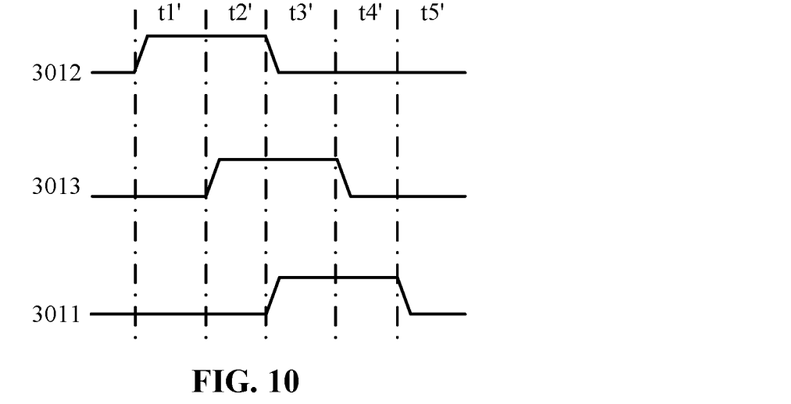
FIG. 10 is a sequence diagram representing that a piezoelectric adjusting bolt provided by an embodiment of the present disclosure is shortened.

In an example, FIG. 9 is a sequence diagram representing that a piezoelectric adjusting bolt provided by an embodiment of the present disclosure is elongated, and FIG. 10 is a sequence diagram representing that a piezoelectric adjusting bolt provided by an embodiment of the present disclosure is shortened. As illustrated in FIG. 7 and FIG. 9, the elongating process of the piezoelectric adjusting bolt includes a first elongating stage t1, a second elongating stage t2, a third elongating stage t3, a fourth elongating stage t4 and a fifth elongating stage t5. In the first elongating stage t1, the power supply is provided to the first piezoelectric stack 3011, and the piezoelectric ceramic plate in the first piezoelectric stack 3011 is controlled to be deformed, so that the whole first piezoelectric stack 3011 is elongated, and the first clamping arm 3014 releases the clamping of the driving rod 303. In the second elongating stage t2, it is continued to provide the power supply to the first piezoelectric stack 3011, and the power supply is further provided to the third piezoelectric stack 3013, to make the piezoelectric ceramic plate in the third piezoelectric stack 3013 deformed, so that the whole third piezoelectric stack 3013 is elongated. The third piezoelectric stack 3013 will squeeze the second piezoelectric stack 3012 to shift left. Because no power supply is provided to the second piezoelectric stack 3012 at this moment, the second piezoelectric stack 3012 will control the second clamping arm 3015 to clamp tight the driving rod 303, so that the second piezoelectric stack 3012 drives the driving rod 303 to shift left together while it moves to the left, and the driving rod 303 drives the movable screw rod 302 to shift left, to make the piezoelectric adjusting bolt longer. In the third elongating stage t3, it is continued to provide the power supply to the third piezoelectric stack 3013, the power supply to the first piezoelectric stack 3011 is stopped, and the power supply is provided to the second piezoelectric stack 3012. The first piezoelectric stack 3011 gradually returns to its original state, the first clamping arm 3014 gradually clamps the driving rod 303 tight, and the piezoelectric ceramic plate in the second piezoelectric stack 3012 is deformed, so that the whole second piezoelectric stack 3012 is elongated and the second clamping arm 3015 gradually releases the clamping of the driving rod 303. When the second piezoelectric stack is elongated, the third piezoelectric stack 3013 is squeezed to move toward the direction of the first piezoelectric stack 3011. In the fourth elongating stage t4, the power supply to the second piezoelectric stack 3012 is maintained, and the power supply to the third piezoelectric stack 3013 is stopped, so that the third piezoelectric stack 3013 returns to its original state, and the second piezoelectric stack 3012 moves toward the side of the third piezoelectric stack 3013. In the fifth elongating stage t5, the power supply to the second piezoelectric stack 3012 is stopped, so that the second piezoelectric stack 3012 returns to its original state, and the second clamping arm 3015 is controlled to clamp tight the driving rod 303, in which the clamping position of the second clamping arm 3015 is moved to the right, so that the piezoelectric adjusting bolt maintains in an elongating state.

As illustrated in FIG. 7 and FIG. 10, the shortening process of the piezoelectric adjusting bolt includes a first shortening stage t1', a second shortening stage t2', a third shortening stage t3', a fourth shortening stage t4' and a fifth shortening stage t5'. In the first stage t1', the power supply is provided to the second piezoelectric stack 3012, so that the piezoelectric ceramic plate in the second piezoelectric stack 3012 is deformed, the whole length of the second piezoelectric stack 3012 is increased, and the second clamping arm 3015 releases the clamping of the driving rod 303. In the second shortening stage t2', it is kept to provide the power supply to the second piezoelectric stack 3012, and the power supply is also provided to the third piezoelectric stack 3013, so that the piezoelectric ceramic plate in the third piezoelectric stack 3013 is deformed, and the whole third piezoelectric stack 3013 is elongated, to squeeze the first piezoelectric stack 3011 to move right. Because no power supply is provided to the first piezoelectric stack 3011 at this moment, the first piezoelectric stack 3011 will control the first clamping arm 3014 to clamp tight the driving rod 303, so that the first piezoelectric stack 3011 drives the driving rod 303 to move to the right while it moves to the right, and the driving rod 303 will drive the movable screw rod 302 to move to the right, to make the piezoelectric adjusting bolt shorter. In the third shortening stage t3', it is kept to provide the power supply to the third piezoelectric stack 3013, the power supply to the second piezoelectric stack 3012 is stopped, and the power supply is provided to the first piezoelectric stack 3011, so that the second piezoelectric stack 3013 gradually returns to its original state, the second clamping arm 3015 gradually clamps the driving rod 303 tight and the clamping position of the second clamping arm 3015 moves to the left, and the piezoelectric ceramic plate in the first piezoelectric stack 3011 is deformed, which allows the whole first piezoelectric stack 3011 to be elongated, and thus the first clamping arm 3011 to gradually release the clamping of the driving rod 303. In the fourth shortening stage t4', it is kept to provide the power supply to the first piezoelectric stack 3011, and the power supply to the third piezoelectric stack 3013 is stopped, so that the third piezoelectric stack 3013 returns to its original state, and the first piezoelectric stack 3011 moves toward the side of the third piezoelectric stack 3013. In the fifth shortening stage t5', the power supply to the first piezoelectric stack 3011 is stopped, so that the first piezoelectric stack 3011 returns to its original state, and the first clamping arm 3011 is controlled to clamp tight the driving rod 303, in which the clamping position of the first clamping arm 3011 moves to the left, so that the piezoelectric adjusting bolt maintains in a shortening state.

Thus, by controlling each piezoelectric stack in the piezoelectric adjust bolt to elongate or shorten in stages, the length of the piezoelectric adjusting bolt can be adjusted, and when the power supply to each piezoelectric stack in the piezoelectric adjusting bolt is stopped, the piezoelectric adjusting bolt can be maintained in the elongating or shortening state, which is beneficial to reducing the power consumption of the posture adjustment device and achieving the effect of energy saving.

Figure 11:
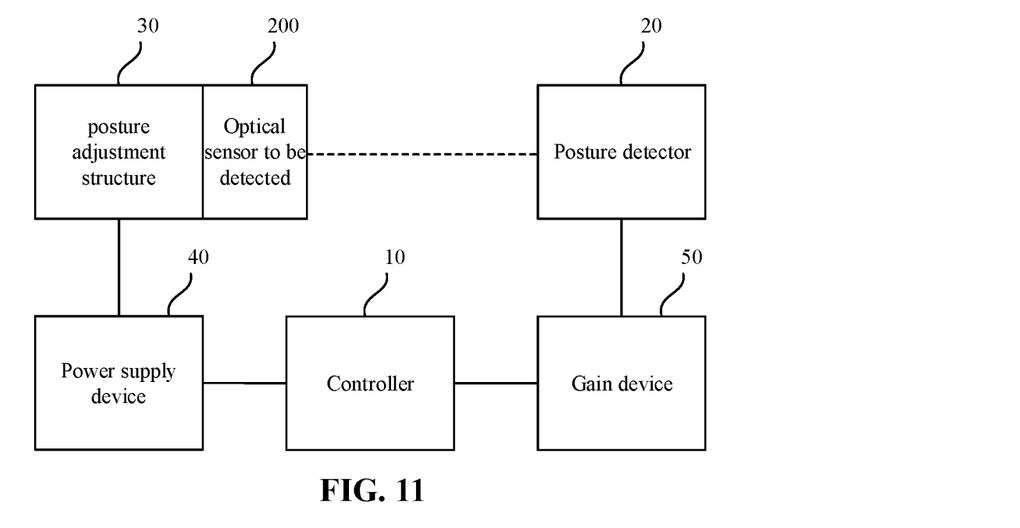
FIG. 11 is a schematic structure view of another posture adjustment device for an optical sensor provided by an embodiment of the present disclosure.

Optionally, FIG. 11 is a structure diagram of another posture adjustment device for an optical sensor provided by an embodiment of the present disclosure. As illustrated in FIG. 11, based on the above embodiment, the posture adjustment device for the optical sensor further includes a gain device 50. The gain device 50 is electrically connected between the controller 10 and the posture detector 20. The gain device 50 can perform signal amplification on posture information sent by the posture detector 20 and then transmit it to the controller 10. Thus, by electrically connecting the gain device 50 between the posture detector 20 and the controller 10, the posture detection precision of the posture detector 20 to the optical sensor to be detected 200 can be improved, and the accuracy and precision of the posture adjustment of the posture adjustment device of the optical sensor to the optical sensor to be detected 200 can be further improved.

Figure 12:
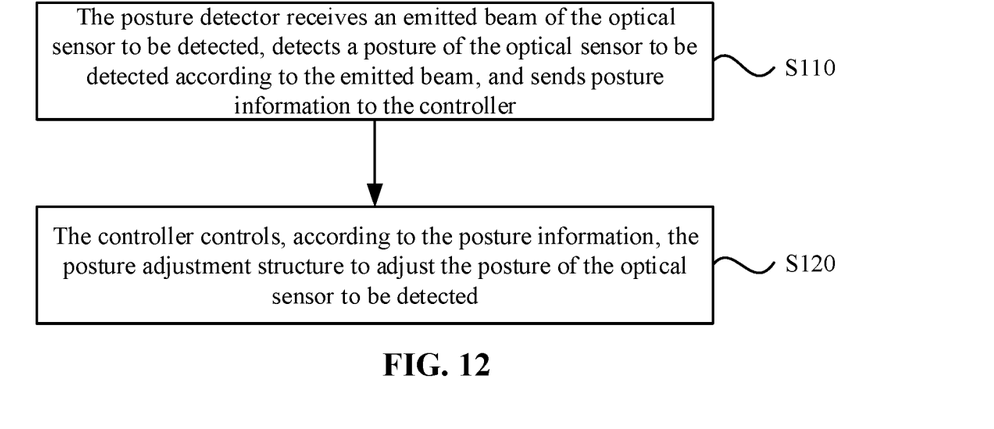
FIG. 12 is a flowchart of a posture adjustment method for an optical sensor provided by an embodiment of the present disclosure.

The embodiment of the present disclosure also provides a posture adjustment method for an optical sensor, which may be applied to the posture adjustment device for an optical sensor provided in the embodiment of the present disclosure, so the posture adjustment method for the optical sensor has the beneficial effects of the posture adjustment device for the optical sensor provided in the embodiment of the present disclosure. For similarities, the above description of the posture adjustment device for the optical sensor provided in the embodiment of the present disclosure may be referred to, so the similarities will not be repeated here. FIG. 12 is a flowchart of a posture adjustment method for an optical sensor provided by an embodiment of the present disclosure. As illustrated in FIG. 12, the posture adjustment method includes the following operations.

At S110, the posture detector receives the emitted beam of the optical sensor to be detected, detects a posture of the optical sensor to be detected according to the emitted beam, and sends posture information to the controller.

At S120, the controller controls, according to the posture information, the posture adjustment structure to adjust the posture of the optical sensor to be detected.

In the embodiment of the present disclosure, the emitted beam of the optical sensor to be detected is received through the posture detector, and the posture information is sent to the controller according to the emitted beam, so that the controller can control, according to the posture information, the posture adjustment structure to adjust the posture of the optical sensor to be detected, so as to be able to detect the current posture of the optical sensor to be detected through the emitted beam of the optical sensor to be detected, and control, according to the current posture of the optical sensor to be detected, the posture adjustment structure to adjust the posture of the optical sensor to be detected until the posture of the optical sensor to be detected is a preset posture. In this case, the posture of the optical sensor to be detected can be automatically adjusted without manual operation, which is beneficial to reducing the manpower cost and improving the posture adjustment efficiency. In addition, the accuracy of posture adjustment can be improved by means of closed-loop detection control, and then the stable operation of the automatic material transport system can be ensured.

Figure 13:
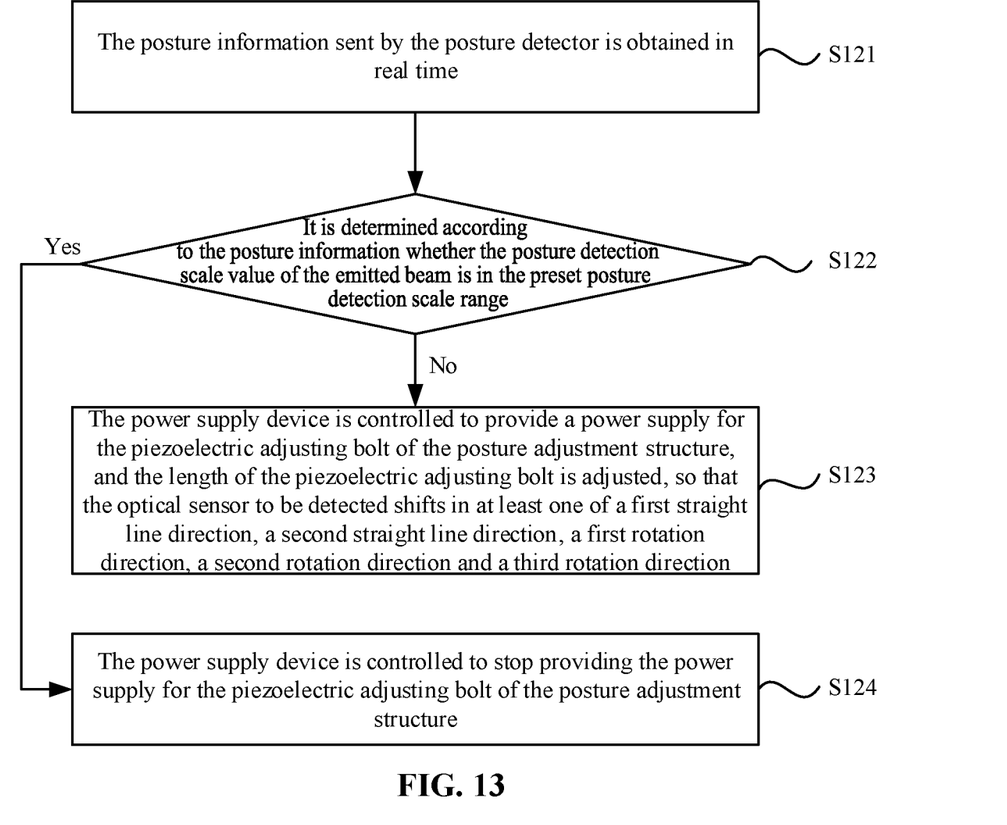
FIG. 13 is a specific flowchart of adjusting the posture of an optical sensor provided by an embodiment of the present disclosure.

Optionally, FIG. 13 is a specific flowchart of adjusting a posture of an optical sensor provided by an embodiment of the present disclosure. As illustrated in FIG. 13, the posture adjustment structure includes a movable bracket, a fixed bracket and multiple piezoelectric adjusting bolts. When the optical sensor to be detected is fixed on the fixed bracket, and the movable bracket is connected with the fixed bracket through the piezoelectric adjusting bolts, the specific method for the controller to control the posture adjustment structure to adjust the posture of the optical sensor to be detected includes the following operations.

At S121, posture information sent by the posture detector is obtained in real time.

At S122, it is determined, according to the posture information, whether the posture detection scale value of the emitted beam is in the preset posture detection scale range; if not, S123 is performed; if so, S124 is performed.

At S123, the power supply device is controlled to provide a power supply for the piezoelectric adjusting bolt of the posture adjustment structure, to adjust the length of the piezoelectric adjusting bolt, so that the optical sensor to be detected shifts in at least one of a first straight line direction, a second straight line direction, a first rotation direction, a second rotation direction or a third rotation direction. The first straight line direction is perpendicular to the second straight line direction, and the third straight line direction is perpendicular to a plane formed by a straight line extending in the first straight line direction and a straight line extending in the second straight line direction. The first rotation direction is a rotation direction taking a straight line extending in the first straight line direction as the axis. The second rotation direction is a rotation direction taking a straight line extending in the second straight line direction as the axis. The third rotation direction is a rotation direction taking a straight line extending in the third straight line direction as the axis.

At S124, the power supply device is controlled to stop providing the power supply for the piezoelectric adjusting bolt of the posture adjustment structure.

In the embodiments of the present disclosure, the posture detection device obtains the emitted beam of the optical sensor to be detected in real time, and sends the posture information to the controller according to the emitted beam, while the controller obtains in real time the posture information sent by the posture adjustment device, and determines according to the posture information whether the position of the emitted beam of the optical sensor to be detected is in the preset posture detection scale range at present. When the position of the emitted beam of the optical sensor to be detected is not in the preset posture detection scale range, the length of the corresponding piezoelectric adjusting bolt is controlled to realize the posture adjustment for the optical sensor to be detected. When the position of the emitted beam of the optical sensor to be detected is in the preset posture detection scale range, the posture adjustment for the optical sensor to be detected is stopped, thereby automatically adjusting the posture of the optical sensor to be detected, saving manpower and improving the adjustment efficiency. In addition, after the optical sensor to be detected is adjusted to the preset posture, the detection accuracy of the optical sensor to be detected can be improved.

Optionally, the piezoelectric adjusting bolt includes the fixed screw rod, the movable screw rod and the driving rod. An end of the driving rod is connected with the movable screw rod, and another end of the driving rod is movably arranged in the fixed screw rod. The fixed screw rod is provided therein with the first clamping arm, the second clamping arm, the first piezoelectric stack, the second piezoelectric stack and the third piezoelectric stack. The first piezoelectric stack, the third piezoelectric stack and the second piezoelectric stack are arranged in sequence, and the second piezoelectric stack is located at a side, close to the movable screw rod, of the third piezoelectric stack. The adjustment of the length of the piezoelectric adjusting bolt includes the first elongating stage, the second elongating stage, the third elongating stage, the fourth elongating stage and the fifth elongating stage.

As illustrated in FIG. 7 and FIG. 9, in the first elongating stage t1, the power supply is provided to the first piezoelectric stack 3011, and the first piezoelectric stack 3011 is controlled to elongate, so that the first clamping arm 3014 releases the driving rod 303, and the driving rod 303 remains static. In the second elongating stage t3, the power supply is provided to the third piezoelectric stack 3013, and the third piezoelectric stack 3013 is controlled to elongate towards a side close to the second piezoelectric stack 3012, so that the second piezoelectric stack 3012 drives the driving rod 303 to shift towards a side away from the first piezoelectric stack 3011, and the driving rod 303 drives the movable screw rod 302 to shift towards a side away from the fixed screw rod 301. In the third elongating stage t3, providing the power supply to the first piezoelectric stack 3011 is stopped and the power supply is provided to the second piezoelectric stack 3012, the first piezoelectric stack 3011 is controlled to shorten, and the second piezoelectric stack 3012 is controlled to elongate towards a side close to the first piezoelectric stack 3011, so that the first clamping arm 3014 clamps the driving rod 303, the second clamping arm 3015 releases the driving rod 303, and the driving rod 303 remains static. In the fourth elongating stage t4, providing the power supply to the third piezoelectric stack 3013 is stopped, and the third piezoelectric stack 3013 is controlled to shorten towards a side close to the first piezoelectric stack 3011, so that the second piezoelectric stack 3012 shifts towards the side close to the first piezoelectric stack 3011, and the driving rod 303 remains static. In the fifth elongating stage t5, providing the power supply to the second piezoelectric stack 3012 is stopped, and the second piezoelectric stack 3012 is controlled to shorten, so that the second clamping arm 3015 clamps tight the driving rod 303 to fix the position of the driving rod 303.

Correspondingly, as illustrated in FIG. 7 and FIG. 10, the adjustment of the length of the piezoelectric adjusting bolt may also include the first shortening stage t1', the second shortening stage t2', the third shortening stage t3', the fourth shortening stage t4' and the fifth shortening stage t5'. In the first shortening stage t1', the power supply is provided to the second piezoelectric stack 3012, and the second piezoelectric stack 3012 is controlled to elongate, so that the second clamping arm 3015 releases the driving rod 303, and the driving rod 303 remains static. In the second shortening stage t2', the power supply is provided to the third piezoelectric stack 3013, and the third piezoelectric stack 3013 is controlled to elongate towards a side close to the first piezoelectric stack 3011, so that the first piezoelectric stack 3011 drives the driving rod 303 to shift towards a side away from the second piezoelectric stack 3012, and the driving rod 303 drives the movable screw rod 302 to shift towards a side close to the fixed screw rod 301. In the third shortening stage t3', providing the power supply to the second piezoelectric stack 3012 is stopped and the power supply is provided to the first piezoelectric stack 3011, the second piezoelectric stack 3012 is controlled to shorten, and the first piezoelectric stack 3011 is controlled to elongate towards a side close to the second piezoelectric stack 3012, so that the second clamping arm 3015 clamps tight the driving rod 303, the first clamping arm 3014 releases the driving rod 303, and the driving rod 303 remains static. In the fourth shortening stage t4', providing the power supply to the third piezoelectric stack 3013 is stopped, and the third piezoelectric stack 3013 is controlled to shorten towards a side close to the second piezoelectric stack 3012, so that the first piezoelectric stack 3011 shifts towards a side close to the second piezoelectric stack 3012, and the driving rod 303 remains static. In the fifth shortening stage t5', providing the power supply to the first piezoelectric stack 3011 is stopped, and the first piezoelectric stack 3011 is controlled to shorten, so that the first clamping arm 3014 clamps tight the driving rod 303 to fix the position of the driving rod 303.

Thus, by controlling each piezoelectric stack in the piezoelectric adjust bolt to elongate or shorten in stages, the length of the piezoelectric adjusting bolt can be adjusted, and when providing the power supply to each piezoelectric stack in the piezoelectric adjusting bolt is stopped, the piezoelectric adjusting bolt can be maintained the elongating or shortening state, which is beneficial to the power consumption of the posture adjustment device, to achieve the effect of energy saving.

The embodiment of the present disclosure also provides an automatic material transport system, which includes multiple material transport vehicles and the posture adjustment device for the optical sensor provided in the embodiment of the present disclosure, so the automatic material transport system also has the beneficial effects of the posture adjustment device for the optical sensor provided in the embodiment of the present disclosure. For similarities, the above description of the posture adjustment device for the optical sensor provided in the embodiment of the present disclosure may be referred to, so the similarities will not be repeated here.

Figure 14:
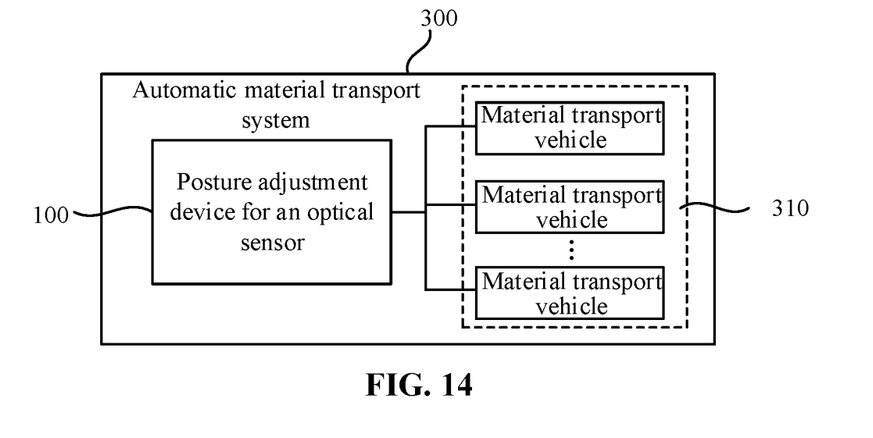
FIG. 14 is a structural block diagram of an automatic material transport system provided by an embodiment of the present disclosure.
Figure 15:
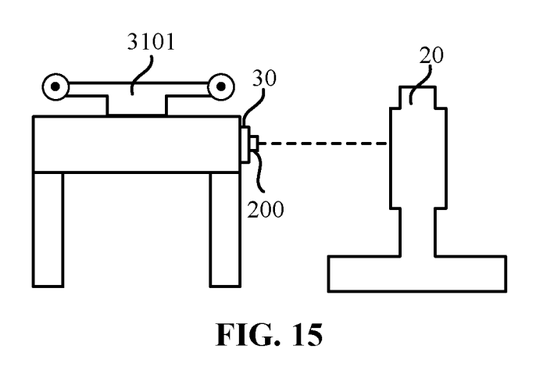
FIG. 15 is a schematic structure view of an automatic material transport system provided by an embodiment of the present disclosure.

In an example, FIG. 14 is a structural block diagram of an automatic material transport system provided by an embodiment of the present disclosure, and FIG. 15 is a schematic structure view of an automatic material transport system provided by an embodiment of the present disclosure. As illustrated in FIG. 14 and FIG. 15, the automatic material transport system 300 includes multiple material transport vehicles 310 and the posture adjustment device 100 for the optical sensor provided in the embodiment of the present disclosure. Each material transport vehicle includes a vehicle body 3101 and an optical sensor 200 fixed on the vehicle body 3101 through the posture adjustment device 30. The optical sensor 200 is an optical sensor to be detected. The posture detection device 20 can receive an emitted beam of the optical sensor 200 fixed on the vehicle body, and send posture information to the controller, so that the controller controls the posture adjustment structure to adjust the posture of the optical sensor 200. Thus, the posture of the optical sensor 200 in the material transport vehicle can be automatically adjusted, and the detection accuracy of the optical sensor 200 in the material transport vehicle can be improved.

It is to be noted that the above description relates to only the preferred embodiments and used technical principles of the present disclosure. Those skilled in the art understand that the present disclosure is not limited to the specific embodiments described here. Those skilled in the art can make various obvious changes, readjustments, combinations and replacements without departing from the protection scope of the present disclosure. Thus, although the present disclosure is described in detail through the above embodiments, the present disclosure is not limited to the above embodiments. More equivalent embodiments may be included without departing from the conception of the present disclosure, and the scope of the present disclosure is determined by the scope of the claims attached.

What is claimed is:

1. A posture adjustment device for an optical sensor, comprising: a controller, a posture detector, and a posture adjustment structure; wherein an optical sensor to be detected is fixed on the posture adjustment structure;

the posture detector is configured to receive an emitted beam of the optical sensor to be detected, detect a posture of the optical sensor to be detected according to the emitted beam, and send posture information to the controller;

the controller is configured to control, according to the posture information, the posture adjustment structure to adjust the posture of the optical sensor to be detected, wherein the posture adjustment device further comprises: a power supply device configured to provide a power supply for the posture adjustment structure under a control of the controller, wherein the posture adjustment structure comprises: a movable bracket, a fixed bracket and a plurality of piezoelectric adjusting bolts; the optical sensor to be detected is fixed on the fixed bracket, and the movable bracket is connected with the fixed bracket through the piezoelectric adjusting bolts;

the controller is configured to control, according to the posture information, the power supply device to provide a power supply for each piezoelectric adjusting bolt, and adjust a length of the piezoelectric adjusting bolt to adjust the posture of the optical sensor to be detected, wherein each of the piezoelectric adjusting bolts comprises a fixed screw rod, a movable screw rod and a driving rod; an end of the driving rod is connected with the movable screw rod, and another end of the driving rod is movably arranged in the fixed screw rod;

a first clamping arm, a second clamping arm, a first piezoelectric stack, a second piezoelectric stack and a third piezoelectric stack are provided in the fixed screw rod; the first piezoelectric stack, the third piezoelectric stack and the second piezoelectric stack are arranged in sequence, and the second piezoelectric stack is located at a side, close to the movable screw rod, of the third piezoelectric stack;

the first piezoelectric stack controls the first clamping arm to clamp the driving rod when not receiving the power supply, and controls the first clamping arm to release the driving rod when receiving the power supply, so that the driving rod drives the movable screw rod to shift or remains static;

the second piezoelectric stack controls the second clamping arm to clamp the driving rod when not receiving the power supply, and controls the second clamping arm to release the driving rod when receiving the power supply, so that the driving rod drives the movable screw rod to shift or remains static;

the third piezoelectric stack controls at least one of the first piezoelectric stack and the second piezoelectric stack to shift when receiving the power supply, so that the driving rod drives the movable screw rod to shift or remains static.

2. The posture adjustment device of claim 1, wherein the posture detector comprises a beam receiving area, the beam receiving area being provided with a posture detection scale;

the posture detector is further configured to generate the posture information according to a position of the emitted beam sent by the optical sensor to be detected in the beam receiving area;

the controller is configured to determine, according to the posture information, a posture detection scale value of the emitted beam in the beam receiving area, and the controller is configured to, when the posture detection scale value is not in a preset posture detection scale range, control the posture adjustment structure to adjust the posture of the optical sensor to be detected, or when the posture detection scale value is in the preset posture detection scale range, control the posture adjustment structure to stop adjusting the posture of the optical sensor to be detected.

3. The posture adjustment device of claim 1, wherein the posture detector comprises a reflector; the posture detector is further configured to take a state of whether the emitted beam sent by the optical sensor to be detected is projected on the reflector of the posture detector as the posture information;

the controller is configured to determine, according to the posture information, that when the emitted beam is not projected on the reflector, the posture of the optical sensor to be detected is not in a preset posture range at present, and then to control the posture adjustment structure to adjust the posture of the optical sensor to be detected, or when the emitted beam is projected on the reflector, the posture of the optical sensor to be detected is in a preset posture range at present, and then to control the posture adjustment structure to stop adjusting the posture of the optical sensor to be detected.

4. The posture adjustment device of claim 1, wherein the movable bracket comprises a first movable plate, a second movable plate and a third movable plate; the plurality of piezoelectric adjusting bolts comprise a first piezoelectric adjusting bolt, a second piezoelectric adjusting bolt, a third piezoelectric adjusting bolt, a fourth piezoelectric adjusting bolt, a fifth piezoelectric adjusting bolt, a sixth piezoelectric adjusting bolt, a seventh piezoelectric adjusting bolt and an eighth piezoelectric adjusting bolt;

the first movable plate and the second movable plate are located on two opposite sides of the optical sensor to be detected; the first movable plate is connected with the fixed bracket through the first piezoelectric adjusting bolt and the second piezoelectric adjusting bolt; the second movable plate is connected with the fixed bracket through the third piezoelectric adjusting bolt and the fourth piezoelectric adjusting bolt;

the third movable plate is connected with the first movable plate through the fifth piezoelectric adjusting bolt and the sixth piezoelectric adjusting bolt; and the third movable plate is further connected with the second movable plate through the seventh piezoelectric adjusting bolt and the eighth piezoelectric adjusting bolt.

5. The posture adjustment device of claim 4, wherein each piezoelectric stack comprises a plurality of stacked piezoelectric ceramic plates.

6. The posture adjustment device of claim 1, further comprising: a gain device;

the gain device is electrically connected between the controller and the posture detector, and the gain device is configured to perform signal amplification on the posture information sent by the posture detector and then transmit it to the controller.

7. A posture adjustment method for an optical sensor, the posture adjustment method being applied to a posture adjustment device for an optical sensor, wherein the posture adjustment method comprises:

receiving, by a posture detector of the posture adjustment device, an emitted beam of an optical sensor to be detected which is fixed on a posture adjustment structure of the posture adjustment device, detecting a posture of the optical sensor to be detected according to the emitted beam, and sending posture information to a controller of the posture adjustment device; and controlling according to the posture information, by the controller, the posture adjustment structure to adjust the posture of the optical sensor to be detected, wherein the posture adjustment device comprises: a power supply device configured to provide a power supply for under a control of the controller, wherein the posture adjustment structure comprises: a movable bracket, a fixed bracket and a plurality of piezoelectric adjusting bolts; the optical sensor to be detected is fixed on the fixed bracket, and the movable bracket is connected with the fixed bracket through the piezoelectric adjusting bolts;

the controller is configured to control, according to the posture information, the power supply device to provide a power supply for each piezoelectric adjusting bolt, and adjust a length of the piezoelectric adjusting bolt to adjust the posture of the optical sensor to be detected, wherein each of the piezoelectric adjusting bolts comprises a fixed screw rod, a movable screw rod and a driving rod; an end of the driving rod is connected with the movable screw rod, and another end of the driving rod is movably arranged in the fixed screw rod;

a first clamping arm, a second clamping arm, a first piezoelectric stack, a second piezoelectric stack and a third piezoelectric stack are provided in the fixed screw rod; the first piezoelectric stack, the third piezoelectric stack and the second piezoelectric stack are arranged in sequence, and the second piezoelectric stack is located at a side, close to the movable screw rod, of the third piezoelectric stack;

the first piezoelectric stack controls the first clamping arm to clamp the driving rod when not receiving the power supply, and controls the first clamping arm to release the driving rod when receiving the power supply, so that the driving rod drives the movable screw rod to shift or remains static;

the second piezoelectric stack controls the second clamping arm to clamp the driving rod when not receiving the power supply, and controls the second clamping arm to release the driving rod when receiving the power supply, so that the driving rod drives the movable screw rod to shift or remains static;

the third piezoelectric stack controls at least one of the first piezoelectric stack and the second piezoelectric stack to shift when receiving the power supply, so that the driving rod drives the movable screw rod to shift or remains static.

8. The posture adjustment method of claim 7, wherein controlling according to the posture information, by the controller, the posture adjustment structure to adjust the posture of the optical sensor to be detected comprises:

obtaining in real time the posture information sent by the posture detector;

determining whether a posture detection scale value of the emitted beam is in a preset posture detection scale range according to the posture information;

if not, controlling a power supply device to provide a power supply for a piezoelectric adjusting bolt of the posture adjustment structure, and adjusting a length of the piezoelectric adjusting bolt, so that the optical sensor to be detected is shifted in at least one of a first straight line direction, a second straight line direction, a first rotation direction, a second rotation direction or a third rotation direction; wherein the first straight line direction is perpendicular to the second straight line direction, a third straight line direction is perpendicular to a plane formed by a straight line extending in the first straight line direction and a straight line extending in the second straight line direction, the first rotation direction is a rotation direction taking a straight line extending in the first straight line direction as an axis, the second rotation direction is a rotation direction taking a straight line extending in the second straight line direction as an axis, and the third rotation direction is a rotation direction taking a straight line extending in the third straight line direction as an axis.

9. The posture adjustment method of claim 8, further comprising:

when the posture detection scale value of the emitted beam is in the preset posture detection scale range, controlling the power supply device to stop providing the power supply for the piezoelectric adjusting bolt of the posture adjustment structure.

10. The posture adjustment method of claim 8, wherein the movable bracket comprises a first movable plate, a second movable plate and a third movable plate; the plurality of piezoelectric adjusting bolts comprise a first piezoelectric adjusting bolt, a second piezoelectric adjusting bolt, a third piezoelectric adjusting bolt, a fourth piezoelectric adjusting bolt, a fifth piezoelectric adjusting bolt, a sixth piezoelectric adjusting bolt, a seventh piezoelectric adjusting bolt and an eighth piezoelectric adjusting bolt; the first movable plate and the second movable plate are located on two opposite sides of the optical sensor to be detected; the first movable plate is connected with the fixed bracket through the first piezoelectric adjusting bolt and the second piezoelectric adjusting bolt; the second movable plate is connected with the fixed bracket through the third piezoelectric adjusting bolt and the fourth piezoelectric adjusting bolt; the third movable plate is connected with the first movable plate through the fifth piezoelectric adjusting bolt and the sixth piezoelectric adjusting bolt; and the third movable plate is further connected with the second movable plate through the seventh piezoelectric adjusting bolt and the eighth piezoelectric adjusting bolt;

when lengths of the fifth piezoelectric adjusting bolt, the sixth piezoelectric adjusting bolt, the seventh piezoelectric adjusting bolt and the eighth piezoelectric adjusting bolt are increased simultaneously, the fixed bracket drives the optical sensor to be detected to move along a negative direction of the first straight line direction; or, when lengths of the fifth piezoelectric adjusting bolt, the sixth piezoelectric adjusting bolt, the seventh piezoelectric adjusting bolt and the eighth piezoelectric adjusting bolt are reduced simultaneously, the fixed bracket drives the optical sensor to be detected to move along a positive direction of the first straight line direction.

11. The posture adjustment method of claim 10, wherein when lengths of the first piezoelectric adjusting bolt and the second piezoelectric adjusting bolt are increased, and simultaneously lengths of the third piezoelectric adjusting bolt and the fourth piezoelectric adjusting bolt are reduced, the fixed bracket drives the optical sensor to be detected to move along a positive direction of the second straight line direction; or, when lengths of the first piezoelectric adjusting bolt and the second piezoelectric adjusting bolt are reduced, and meanwhile lengths of the third piezoelectric adjusting bolt and the fourth piezoelectric adjusting bolt are increased, the fixed bracket drives the optical sensor to be detected to move along a negative direction of the second straight line direction.

12. The posture adjustment method of claim 10, wherein when lengths of the third piezoelectric adjusting bolt and the second piezoelectric adjusting bolt are increased, and simultaneously lengths of the fourth piezoelectric adjusting bolt and the first piezoelectric adjusting bolt are reduced, the fixed bracket drives the optical sensor to be detected to rotate counterclockwise around the first straight line direction as the axis; or, when lengths of the third piezoelectric adjusting bolt and the second piezoelectric adjusting bolt are reduced, and simultaneously lengths of the fourth piezoelectric adjusting bolt and the first piezoelectric adjusting bolt are increased, the fixed bracket drives the optical sensor to be detected to rotate clockwise around the first straight line direction as the axis.

13. The posture adjustment method of claim 10, wherein when the lengths of the eighth piezoelectric adjusting bolt and the sixth piezoelectric adjusting bolt are increased, and simultaneously the lengths of the seventh piezoelectric adjusting bolt and the fifth piezoelectric adjusting bolt are reduced, the fixed bracket drives the optical sensor to be detected to rotate counterclockwise around the second straight line direction as the axis; or, when the lengths of the eighth piezoelectric adjusting bolt and the sixth piezoelectric adjusting bolt are reduced, and simultaneously the lengths of the seventh piezoelectric adjusting bolt and the fifth piezoelectric adjusting bolt are increased, the fixed bracket drives the optical sensor to be detected to rotate clockwise around the second straight line direction as the axis.

14. The posture adjustment method of claim 10, wherein when the lengths of the fifth piezoelectric adjusting bolt and the sixth piezoelectric adjusting bolt are reduced, and simultaneously the lengths of the seventh piezoelectric adjusting bolt and the eighth piezoelectric adjusting bolt are increased, the fixed bracket drives the optical sensor to be detected to rotate counterclockwise around the third straight line direction as the axis; or, when the lengths of the fifth piezoelectric adjusting bolt and the sixth piezoelectric adjusting bolt are increased, and simultaneously the lengths of the seventh piezoelectric adjusting bolt and the eighth piezoelectric adjusting bolt are reduced, the fixed bracket drives the optical sensor to be detected to rotate clockwise around the third straight line direction as the axis.

15. The posture adjustment method of claim 8, wherein adjusting the length of the piezoelectric adjusting bolt comprises a first elongating stage, a second elongating stage, a third elongating stage, a fourth elongating stage and a fifth elongating stage;
in the first elongating stage, providing the power supply to the first piezoelectric stack, and controlling the first piezoelectric stack to elongate, so that the first clamping arm releases the driving rod, and the driving rod remains static;
in the second elongating stage, providing the power supply to the third piezoelectric stack, and controlling the third piezoelectric stack to elongate towards a side close to the second piezoelectric stack, so that the second piezoelectric stack drives the driving rod to shift towards a side away from the first piezoelectric stack, and the driving rod drives the movable screw rod to shift towards a side away from the fixed screw rod;
in the third elongating stage, stopping providing the power supply to the first piezoelectric stack, but providing the power supply to the second piezoelectric stack, controlling the first piezoelectric stack to shorten, and controlling the second piezoelectric stack to elongate towards a side close to the first piezoelectric stack, so that the first clamping arm clamps the driving rod, the second clamping arm releases the driving rod, and the driving rod remains static;
in the fourth elongating stage, stopping providing the power supply to the third piezoelectric stack, and controlling the third piezoelectric stack to shorten towards a side close to the first piezoelectric stack, so that the second piezoelectric stack shifts towards the side close to the first piezoelectric stack, and the driving rod remains static; and
in the fifth elongating stage, stopping providing the power supply to the second piezoelectric stack, and controlling the second piezoelectric stack to shorten, so that the second clamping arm clamps the driving rod to fix the position of the driving rod.

16. The posture adjustment method of claim 8, wherein adjusting the length of the piezoelectric adjusting bolt comprises a first shortening stage, a second shortening stage, a third shortening stage, a fourth shortening stage and a fifth shortening stage;
in the first shortening stage, providing the power supply to the second piezoelectric stack, and controlling the second piezoelectric stack to elongate, so that the second clamping arm releases the driving rod, and the driving rod remains static;
in the second shortening stage, providing the power supply to the third piezoelectric stack, and controlling the third piezoelectric stack to elongate towards a side close to the first piezoelectric stack, so that the first piezoelectric stack drives the driving rod to shift towards a side away from the second piezoelectric stack, and the driving rod drives the movable screw rod to shift towards a side close to the fixed screw rod;
in the third shortening stage, stopping providing the power supply to the second piezoelectric stack, but providing the power supply to the first piezoelectric stack, controlling the second piezoelectric stack to shorten, and controlling the first piezoelectric stack to elongate towards a side close to the second piezoelectric stack, so that the second clamping arm clamps the driving rod, the first clamping arm releases the driving rod, and the driving rod remains static;
in the fourth shortening stage, stopping providing the power supply to the third piezoelectric stack, and controlling the third piezoelectric stack to shorten towards a side close to the second piezoelectric stack, so that the first piezoelectric stack shifts towards a side close to the second piezoelectric stack, and the driving rod remains static; and
in the fifth shortening stage, stopping providing the power supply to the first piezoelectric stack, and controlling the first piezoelectric stack to shorten, so that the first clamping arm clamps the driving rod to fix the position of the driving rod.

17. An automatic material transport system, comprising: a plurality of material transport vehicles and a posture adjustment device for an optical sensor, the posture adjustment device comprising: a controller, a posture detector, and a posture adjustment structure; an optical sensor to be detected being fixed on the posture adjustment structure; the posture detector being configured to receive an emitted beam of the optical sensor to be detected, detect a posture of the optical sensor to be detected according to the emitted beam, and send posture information to the controller; and the controller being configured to control, according to the posture information, the posture adjustment structure to adjust the posture of the optical sensor to be detected;
wherein each material transport vehicle comprises a vehicle body and an optical sensor fixed on the vehicle body through the posture adjustment device,
wherein the posture adjustment device comprises: a power supply device configured to provide a power supply for the posture adjustment structure under a control of the controller, wherein the posture adjustment structure comprises: a movable bracket, a fixed bracket and a plurality of piezoelectric adjusting bolts; the optical sensor to be detected is fixed on the fixed bracket, and the movable bracket is connected with the fixed bracket through the piezoelectric adjusting bolts;
the controller is configured to control, according to the posture information, the power supply device to provide a power supply for each piezoelectric adjusting bolt, and adjust a length of the piezoelectric adjusting bolt to adjust the posture of the optical sensor to be detected, wherein each of the piezoelectric adjusting bolts comprises a fixed screw rod, a movable screw rod and a driving rod; an end of the driving rod is connected with the movable screw rod, and another end of the driving rod is movably arranged in the fixed screw rod;
a first clamping arm, a second clamping arm, a first piezoelectric stack, a second piezoelectric stack and a third piezoelectric stack are provided in the fixed screw rod; the first piezoelectric stack, the third piezoelectric stack and the second piezoelectric stack are arranged in sequence, and the second piezoelectric stack is located at a side, close to the movable screw rod, of the third piezoelectric stack;
the first piezoelectric stack controls the first clamping arm to clamp the driving rod when not receiving the power supply, and controls the first clamping arm to release the driving rod when receiving the power supply, so that the driving rod drives the movable screw rod to shift or remains static;
the second piezoelectric stack controls the second clamping arm to clamp the driving rod when not receiving the power supply, and controls the second clamping arm to release the driving rod when receiving the power supply, so that the driving rod drives the movable screw rod to shift or remains static;

the third piezoelectric stack controls at least one of the first piezoelectric stack and the second piezoelectric stack to shift when receiving the power supply, so that the driving rod drives the movable screw rod to shift or remains static.

\* \* \* \* \*